United States Patent [19]

Briggs et al.

[11] B 3,982,057
[45] Sept. 21, 1976

[54] PAPER HONEYCOMB CUSHIONING PAD

[75] Inventors: William R. Briggs, Bowie, Md.; Eugene A. Ripperger, Austin, Tex.

[73] Assignee: The United States of America as represented by the Secretary of the Army, Washington, D.C.

[22] Filed: June 21, 1974

[21] Appl. No.: 481,737

[44] Published under the second Trial Voluntary Protest Program on January 13, 1976 as document No. B 481,737.

[52] U.S. Cl. .................................. 428/73; 93/1 H; 108/51.3; 156/332; 206/521; 229/28 R; 428/118
[51] Int. Cl.² .......................................... B32B 3/12
[58] Field of Search .............. 161/68, 69; 156/197, 156/332; 52/615, 618; 29/455 LM; 428/73, 192, 116–120, 35, 72; 93/1 H, 1 WZ; 108/51; 229/28 R, 29 D; 206/521

[56] References Cited
UNITED STATES PATENTS

| | | | |
|---|---|---|---|
| 2,428,979 | 10/1947 | May | 156/197 |
| 2,477,852 | 8/1949 | Bacon | 161/68 |
| 2,768,924 | 10/1956 | Wright | 161/43 |
| 2,889,297 | 6/1959 | Brandner et al. | 156/332 X |
| 2,937,956 | 5/1960 | Fendius et al. | 117/76 |
| 3,035,961 | 5/1962 | Jones et al. | 156/197 |
| 3,247,039 | 4/1966 | Schultheiss | 156/167 |
| 3,587,479 | 6/1971 | Geschwender | 108/51 |
| 3,756,894 | 9/1973 | Shugart | 156/443 |

FOREIGN PATENTS OR APPLICATIONS

| | | | |
|---|---|---|---|
| 129,793 | 11/1948 | Australia | 161/68 |

Primary Examiner—George F. Lesmes
Assistant Examiner—Henry F. Epstein
Attorney, Agent, or Firm—Nathan Edelberg; Robert P. Gibson; Charles C. Rainey

[57] ABSTRACT

Paper honeycomb cushioning pads having the ends thereof, which are normal to the glue lines that adhere the sheets of paper forming the honeycomb together, sealed with a paper tape cap or the like adhered to the paper honeycomb. This prevents or minimizes blowouts at the ends of the pads. The resulting paper honeycomb cushioning pads have appreciably higher and more uniform crushing strengths that similar paper honeycomb cushioning pads produced in accordance with the prior art in which the ends are not sealed.

3 Claims, 4 Drawing Figures

PAPER HONEYCOMB CUSHIONING PAD

The invention described herein may be manufactured, used, and licensed by or for the Government for governmental purposes without the payment to us of any royalty thereon.

BACKGROUND OF THE INVENTION

This invention relates to paper honeycomb cushioning pads having improved energy absorbing properties.

In recent years, paper honeycomb has come into widespread use as a cushioning material for dissipating the energy released upon impact of a moving object with another moving or stationary object or with the ground. The Armed Forces have adopted airdrop delivery, preferably from low-flying aircraft, as one method of distributing supplies to troops in the field. Heavy equipment is also being delivered by airdrop at points where it is urgently needed. Usually supplies or equipment are lashed to a rigid platform or pallet for this purpose. Parachutes are employed to reduce the velocities of the loaded pallets. However, the shock of landing must be absorbed in some manner so that as little damage as possible will be done to the supplies or equipment. This is done either by fastening paper honeycomb cushioning pads to the underside of the pallet or by interposing such pads between the pallet and the equipment or supplies lashed to the pallet.

It has been found that when heavy loads cushioned by means of paper honeycomb pads landed, quite often a blowout occurred at one or both of the ends of many of the cushioning pads. The ends are normal to the glue lines that cement the sheets of paper together forming hexagonally shaped cells in the expanded paper honeycomb. A blowout usually begins by separation of the glue lines nearest to an end of the pad and progresses inwardly of the pad as failure of successive glue lines occurs. Such blowouts result in rather wide variations in the impact strengths of similarly prepared paper honeycomb cushioning pads of the prior art.

It is, therefore, an object of the invention to provide paper honeycomb cushioning pads having improved impact strengths.

A further object of the invention is a substantial reduction of blowouts of paper honeycomb cushioning pads so that such pads will accomplish the maximum possible energy absorption when crushed by impact.

Other objects and advantages of the invention will be apparent from the following description of the invention, and the novel features will be particularly pointed out hereinafter in connection with the appended claims.

SUMMARY

The objects of the invention are accomplished by providing paper honeycomb cushioning pads having the ends thereof which are normal to the glue lines that cement the sheets of paper forming the honeycomb together closed and sealed with material in sheet form having low porosity, such as Kraft paper tape in the shape of a cap, so as to prevent the occurrence of blowouts through these ends upon impact of an object cushioned by means of such pads.

DETAILED DESCRIPTION OF THE INVENTION

Figure 1:
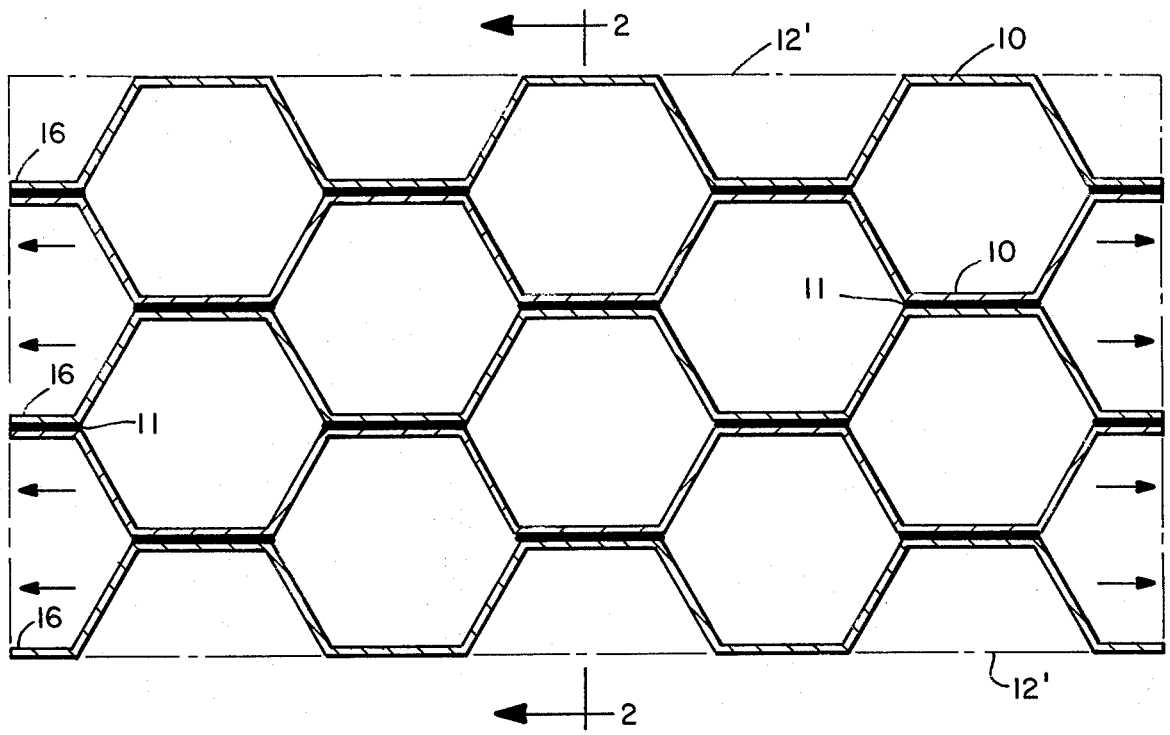
FIG. 1 is a horizontal cross-section of a portion of a paper honeycomb cushioning pad of the prior art.
Figure 2:
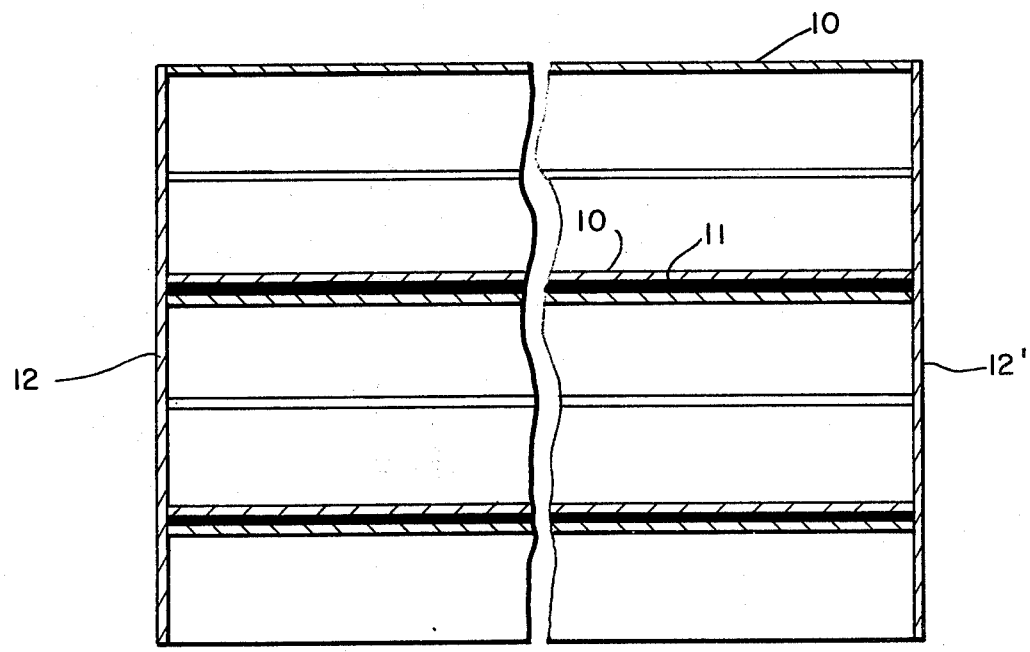
FIG. 2 is a vertical cross-section through the portion of a paper honeycomb cushioning pad of the prior art shown in FIG. 1, taken through a plane represented by the line 2-2 of FIG. 1.

Paper honeycomb produced in accordance with the prior art is shown in FIGS. 1 and 2. In such paper honeycomb, sheets of Kraft paper 10 are cemented together along parallel glue lines 11, which are spaced apart so that when a collapsed log of intermittently cemented together sheets of Kraft paper is expanded as shown in FIG. 1, hexagonally shaped cells having walls of Kraft paper are formed. In order to close these cells, facing sheets 12 and 12' of Kraft paper are cemented over the two ends of the groups of adjacent cells, as shown in FIG. 2. This expansion of paper honeycomb logs and the application of sheets of Kraft paper to the ends of the cells to complete the formation of double faced paper honeycomb cushioning pads according to the prior art, as represented by reference numeral 13, is described with particularization in U.S. Pat. No. 3,035,961, incorporated herein by reference.

In the customary usage of double faced paper honeycomb cushioning pads as shock absorbing materials in airdrop delivery or similar applications, crushing usually occurs in a direction normal to the plane of the illustration in FIG. 1 and, therefore, normal to the facing sheets. As crushing progresses, the volume of air enclosed within each cell between the load and the surface upon which impact occurs is reduced and the pressure of the air in the cell is increased. Because of the pressure differential between the air inside of each cell and the outside air, the entrapped air tries to escape. Some air passes slowly through the pores of the paper which has low porosity. However, the high pressure of the air may cause the glue lines 11 to separate. This is particularly likely to occur first at the ends of the paper honeycomb pads since the pressure differential is greatest there. As a consequence, blowouts may occur at one or both of the ends of the pad with the air rushing out in the direction as indicated by the arrows in FIG. 1. A blowout will progress from the ends inwardly of the cushioning pad because the high pressure differential works its way inwardly once a blowout begins at an end of a pad. When separation at the glue lines occurs, the energy absorption through crushing of the paper honeycomb cells is reduced in that portion of the honeycomb. In practice, not all of the cells of a paper honeycomb cushioning pad are involved in a blowout. Hence, appreciable amounts of energy are absorbed through the crushing of the walls of the paper honeycomb cells and the gradual leakage of the compressed air to the atmosphere through the pores of the paper.

We have found that sealing of the ends of the paper honeycomb cushioning pads, that are normal to the glue lines that cement the sheets of paper forming the honeycomb together, by adhering paper tape or other types of material in sheet form thereover and thus closing and sealing the ends greatly reduces the incidence of blowout through failure of the glue lines. In consequence thereof the apparent crushing strengths of such pads will generally be increased by 10 to 15 percent and the volume of paper honeycomb cushioning pad material required for the absorption of a given amount of energy may be reduced as much as 25% from that previously required with paper honeycomb cushioning pads which were not sealed at the ends normal to the glue lines. It is believed that this result is attained partly due to the fact that higher pressure is built up within more of the cells of the paper honeycomb during crushing thereof than when the ends of the pads are not sealed. To dissipate the maximum amount of energy, it appears that the entrapped air must leak out slowly while it is still under pressure. The prevention of blowouts thus maintains high pressure in all of the cells, thereby making the resistance to crushing more uniform throughout each cushioning pad and increasing the apparent crushing strength of each paper honeycomb cushioning pad.

Figure 3:
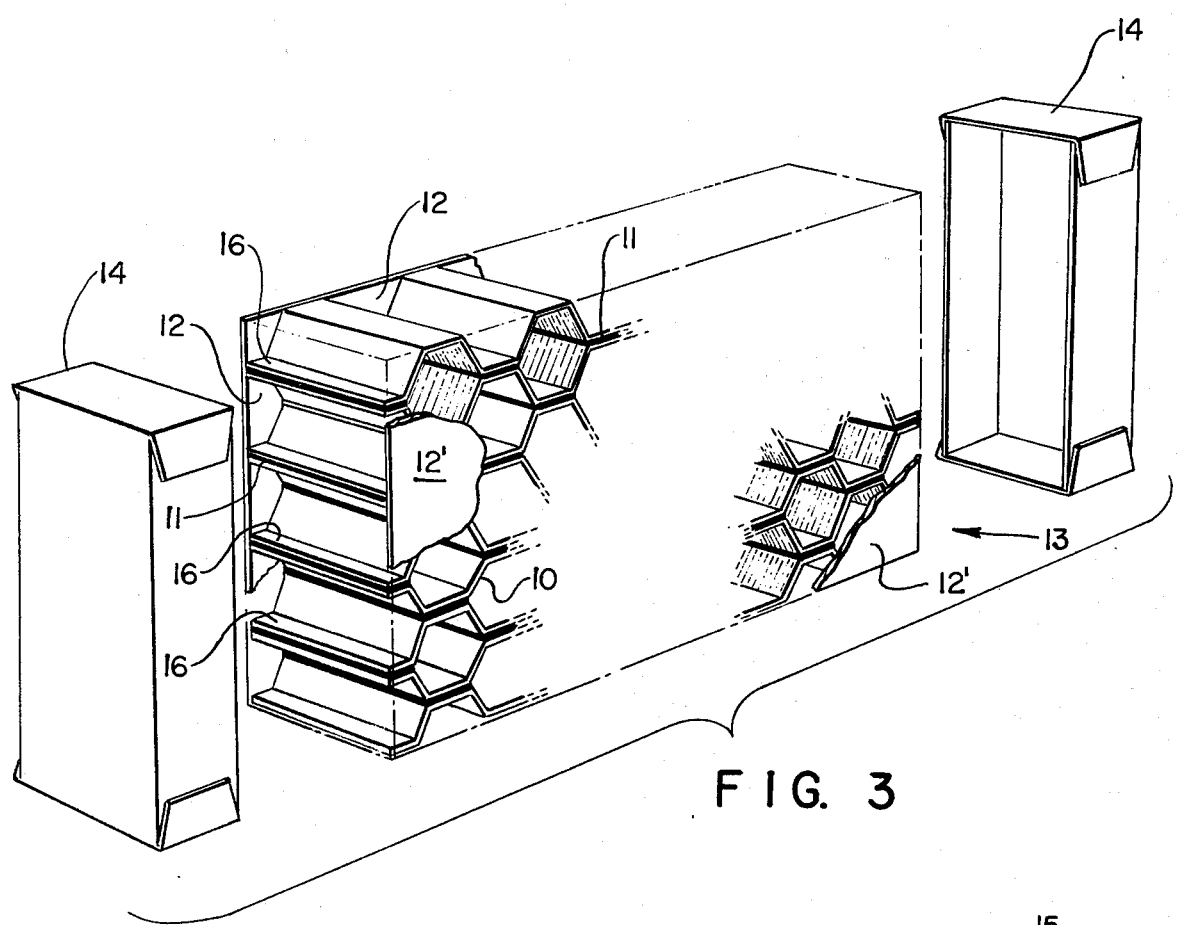
FIG. 3 is an exploded perspective view of a paper honeycomb cushioning pad in accordance with the invention with the paper facing shown in place over one end of the cells and with the paper facing over the other end of the cells shown partially broken away to show the cellular structure of the paper honeycomb. The paper caps employed in accordance with the invention to close and seal the ends of the paper honeycomb cushioning pad which are normal to the glue lines that cement the sheets of paper forming the honeycomb together are shown exploded from the ends of the paper honeycomb.
Figure 4:
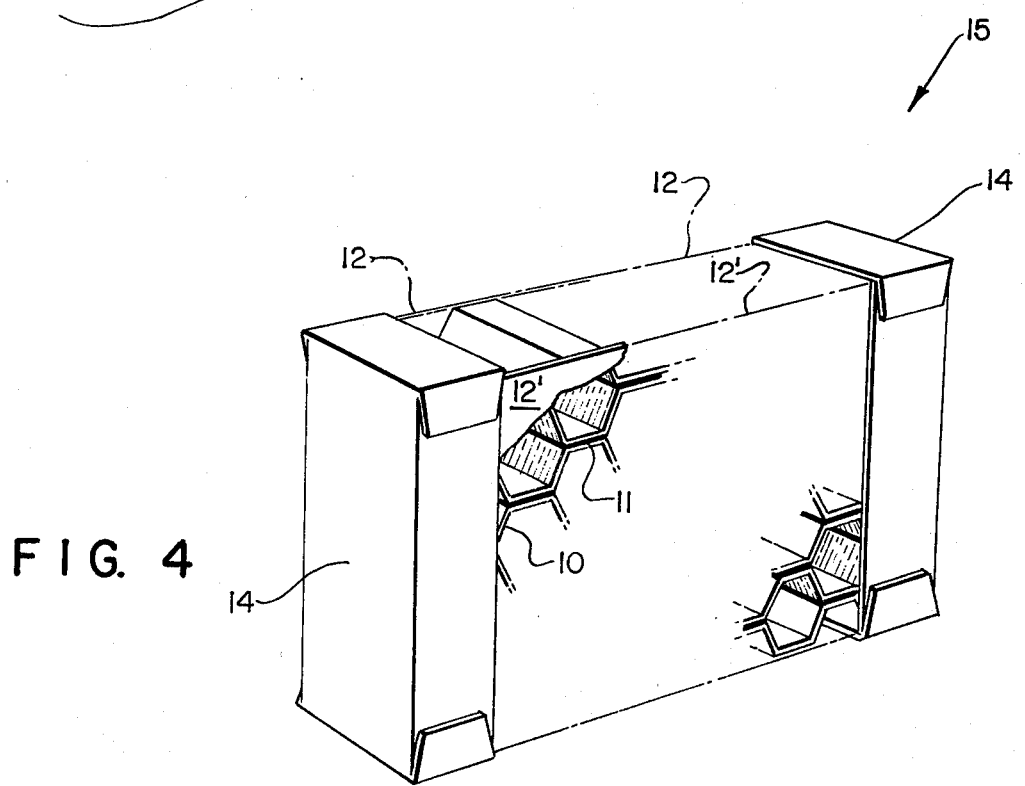
FIG. 4 is a perspective view of a completed paper honeycomb cushioning pad of the invention, such as that of FIG. 3, with the paper caps applied over the ends of the paper honeycomb cushioning pad and sealed to the ends of the pad about the periphery of each paper cap.

The above discussed result may be obtained by preparing a slice of expanded paper honeycomb in accordance with prior art methods, for example as described in U.S. Pat. No. 3,035,961, and as represented by FIGS. 1 and 2 herein and applying over both ends thereof an end cap 14, as shown by FIGS. 3 and 4 hereof. This end cap may be made of self-sealing tape or paper tape glued around all of its edges to the exterior surfaces of the facing sheets 12 and 12' as well as to the cut glued ends 16 and the exterior surfaces of the Kraft paper sheets 10 forming the first row of closed cells at each end of the slice of paper honeycomb using a suitable glue to adhere the end cap to the Kraft paper. This may be done manually or by means of a machine designed for the purpose. The completed paper honeycomb cushioning pad according to the invention is represented by reference numeral 15 in FIG. 4. In this paper honeycomb cushioning pad the peripheries of end caps 14 are sealed, entrapping air within all of the cells and keeping the entrapped air from escaping rapidly even though the pressure of the air within the cells builds up rapidly upon impact.

The paper tape used for sealing the ends of the paper honeycomb cushioning pads may be made of 70 to 80 lb. Kraft paper having a thickness of about 0.007 inches. This paper tape is folded over the top, bottom, and side surfaces of the paper honeycomb slice and glued along the folded over edges. Elmers Glue-all No. E384, manufactured by Borden, Inc., or any other good grade of glue which will produce a strong bond between two Kraft paper surfaces may be used for the purpose. Instead of the above Kraft paper tape, a self-adhering paper tape coated on one face thereof with a vinyl resin, the Kraft paper tape being about 0.013 inches thick and of a width suitable for covering the end of the slice of paper honeycomb and overlapping the top, bottom, and side surfaces, such as "Tuck" tape, a self-adhering vinyl resin coated tape which is manufactured by Technical Tape Corp., New Rochelle, N. Y., may be employed to seal the two ends of the slice of paper honeycomb and complete the paper honeycomb cushioning pad of the invention.

The paper tape may be adhered to the paper honeycomb by means of an aqueous emulsion of vinyl acetate resin, or polyvinyl acetate dissolved in a non-aqueous solvent, or other types of adhesive which are suitable for adhering Kraft paper to Kraft paper. Also, other types of self-adhering tape than that discussed above may be used, provided it has adequate strength and adhesion to Kraft paper to effect a sufficiently strong seal over the ends of the cushioning pads to prevent blowouts at the ends.

While the improved paper honeycomb cushioning pad of the invention has been described as being produced using either paper tape and a glue or self-adhering vinyl resin coated paper tape for closing and sealing the ends of slices of double faced paper honeycomb material to prevent blowouts at the ends, it will be understood that other materials and forms thereof may be employed for the purpose of closing and sealing the ends so that the air entrapped within the cells of the paper honeycomb will leak out of the paper honeycomb cushioning pad slowly enough to cause buildup of pressure within the cells. For example, the ends of the honeycomb cushioning pad may be closed and sealed with synthetic resin film in tape or sheet form adhered to the exterior surfaces of the paper honeycomb adjacent to the ends thereof. The ends of the paper honeycomb cushioning pad may also be closed and sealed with preformed synthetic resin end caps molded or otherwise formed to fit snugly over the ends and glued, heat-sealed, or otherwise sealed in place over the ends of the paper honeycomb. The end caps do not have to be completely impervious to air. It is only necessary that they prevent such rapid escape of air as would be substantially equivalent to a blowout such as occurred with the paper honeycomb cushioning materials of the prior art, that they substantially prevent separation of the glue from the paper, and that they cause air pressure to increase throughout the paper honeycomb cushioning pad when it is impacted. The end caps thus contribute to or cause slow escape of air primarily by leakage through the fine pores of the paper walls of the paper honeycomb material. It is preferred that the material of the end caps have a porosity no higher than the porosity of 70 lb. Kraft paper.

The invention produces the advantage over the prior art of higher apparent crushing strength and greater uniformity in the crushing strength of paper honeycomb cushioning pads. As a result, by exercising reasonable care in the preparation of the cushioning pads according to the invention one can confidently expect that a given cushioning pad will not crush so much more easily than another as to cause equipment to tip over when being airdropped with cushioning at both sides and at the front and rear thereof. This is a particularly important consideration when very heavy equipment, such as trucks, tanks, Jeeps, and the like are being airdropped, inequalities in crushing strength resulting in differences in cushioning between different portions of the equipment. It is important in planning the cushioning arrangements for heavy equipment that each cushioning pad or stack of cushioning pads crush as nearly as possible at the same rate as other cushioning pads or stacks of cushioning pads. The present invention contributes very greatly to making this possible.

It will be understood that various changes in the details, materials and arrangements of parts which have been herein described and illustrated in order to explain the nature of the invention, may be made by those skilled in the art within the principle and scope of the invention.

We claim:

1. In a double faced expanded paper honeycomb cushioning pad adapted for preventing blowouts through the ends of said double faced expanded paper honeycomb cushioning pad upon impact, said double faced expanded paper honeycomb cushioning pad comprising a plurality of sheets of Kraft paper adhered together along parallel spaced apart glue lines, expanded to form air cells hexagonally shaped in cross section and bounded by portions of said sheets of Kraft paper, and double faced by facing sheets of Kraft paper adhered over the top and bottom of the expanded paper honeycomb cushioning pad, thereby forming in said double faced expanded paper honeycomb cushioning pad a plurality of adjacent closed air cells hexagonally shaped in cross section, said double faced expanded paper honeycomb cushioning pad having a pair of ends each comprising a row of vertically sliced air cells, the glue lines of said vertically sliced air cells being normal to said ends, the improvement which comprises means for preventing blowouts through said ends of said double faced expanded paper honeycomb cushioning pad, said blowout preventing means comprising two end caps, each of said two end caps being adhered to the exterior surfaces of said double faced expanded paper honeycomb cushioning pad adjacent to one of said two ends so as to close and seal each of said two ends, said end caps being constructed of 70 to 80 lb. Kraft paper tape, said Kraft paper tape being folded over said facing sheets and over the side surfaces of said double faced expanded paper honeycomb cushioning pad to a sufficient extent and adhered sufficiently tightly to said facing sheets and said side surfaces to prevent a blowout from occurring through either of said two ends of said double faced expanded paper honeycomb cushioning pad upon impact.

2. A double faced expanded paper honeycomb cushioning pad according to claim 1, wherein said Kraft paper tape is adhered to said double faced honeycomb cushioning pad by means of an aqueous emulsion of vinyl acetate resin.

3. A double faced expanded paper honeycomb cushioning pad according to claim 1, wherein said Kraft paper tape is self-adhering vinyl resin coated Kraft paper tape.

* * * * *